(12) United States Patent
Johnson et al.

(10) Patent No.: US 8,807,106 B2
(45) Date of Patent: Aug. 19, 2014

(54) CAMSHAFT

(75) Inventors: Philip D. Johnson, Whitehall, MI (US); Richard M. Kritzman, Whitehall, MI (US)

(73) Assignee: Textron Inc., Providence, RI (US)

( * ) Notice: Subject to any disclaimer, the term of this patent is extended or adjusted under 35 U.S.C. 154(b) by 472 days.

(21) Appl. No.: 13/047,767

(22) Filed: Mar. 14, 2011

(65) Prior Publication Data

US 2011/0226201 A1    Sep. 22, 2011

Related U.S. Application Data

(60) Provisional application No. 61/315,740, filed on Mar. 19, 2010.

(51) Int. Cl.
*F01L 1/04*        (2006.01)
(52) U.S. Cl.
USPC .................................. 123/90.6; 123/90.1
(58) Field of Classification Search
USPC ................ 123/90.6, 90.15–18, 90.1
See application file for complete search history.

(56) References Cited

U.S. PATENT DOCUMENTS

| | | | | |
|---|---|---|---|---|
| 4,798,178 | A * | 1/1989 | Greulich et al. | 123/90.6 |
| 5,992,265 | A * | 11/1999 | Klaar | 74/567 |
| 7,409,938 | B2 * | 8/2008 | Dengler | 123/90.18 |
| 2003/0033901 | A1* | 2/2003 | Sugaya et al. | 74/567 |

FOREIGN PATENT DOCUMENTS

| | | | | |
|---|---|---|---|---|
| EP | 0335945 | * 10/1989 | | B29C 37/00 |
| KR | 10201088780 | 8/2010 | | |
| WO | WO 2006041255 A1 | * 4/2006 | | B22D 19/04 |
| WO | WO-2006/097767 A1 | 9/2006 | | |
| WO | WO-2008/026029 A2 | 3/2008 | | |

OTHER PUBLICATIONS

International Search Report & Written Opinion in PCT/US2011/028639 dated Mar. 16, 2011.

* cited by examiner

*Primary Examiner* — Thai Ba Trieu
*Assistant Examiner* — Thomas Olszewski
(74) *Attorney, Agent, or Firm* — Foley & Lardner LLP

(57) ABSTRACT

A camshaft assembly configured to rotate about an axis of rotation within the engine of a motor vehicle to provide timing between cyclic operation of engine components is provided. The camshaft assembly includes a member for providing timing to a first engine component. The member includes a cam surface configured to drive the timing of the first engine component, and an opening. The camshaft assembly also includes a camshaft body cast to the member and configured to engage the opening of the member. The camshaft body includes a lobe configured to drive the timing of a second engine component, and a journal configured to allow efficient rotation of the camshaft body about the axis of rotation. The member is formed from a first material and the camshaft body is formed from a second material, thereby allowing the camshaft assembly to withstand two levels of stress.

19 Claims, 2 Drawing Sheets

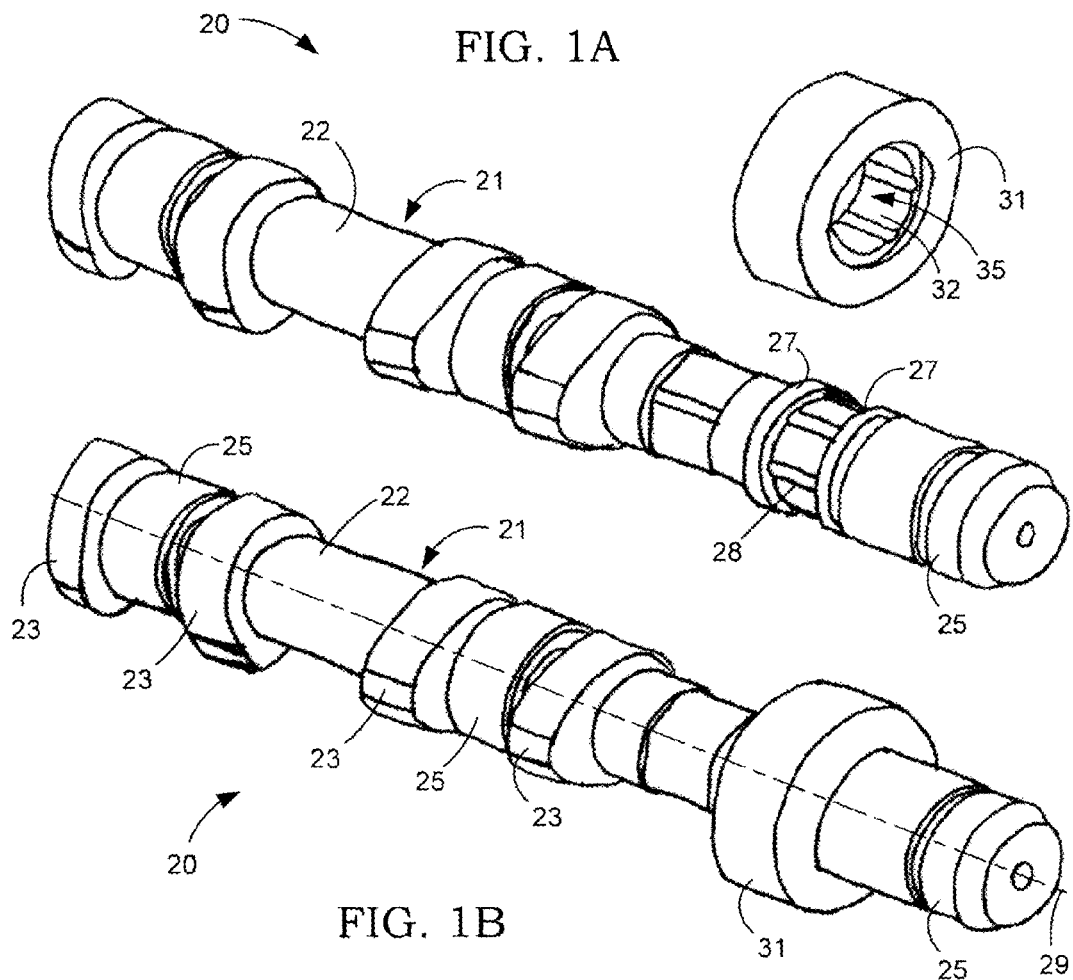
FIG. 1A
FIG. 1B
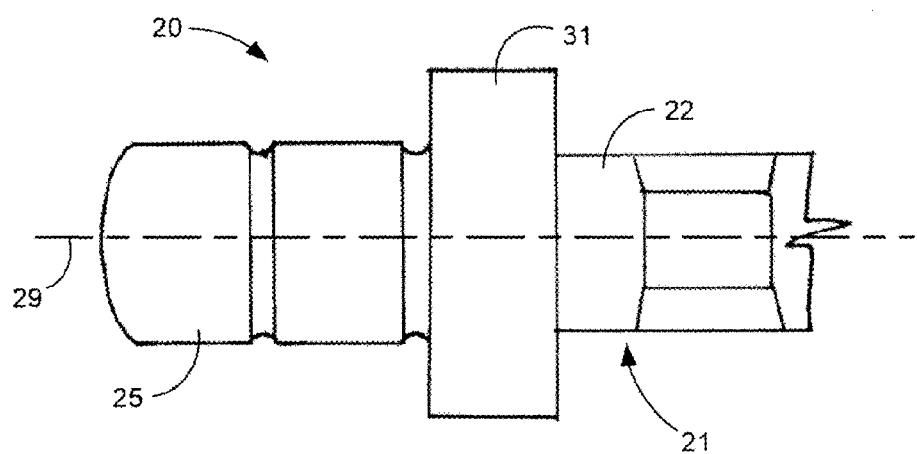
FIG. 2

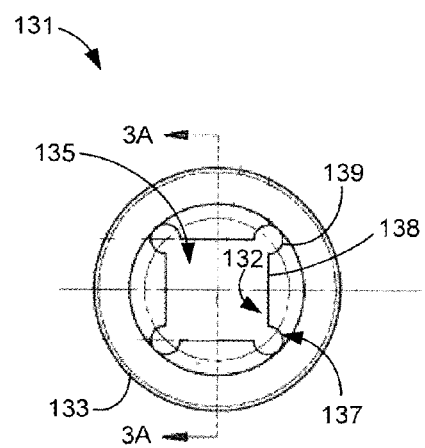
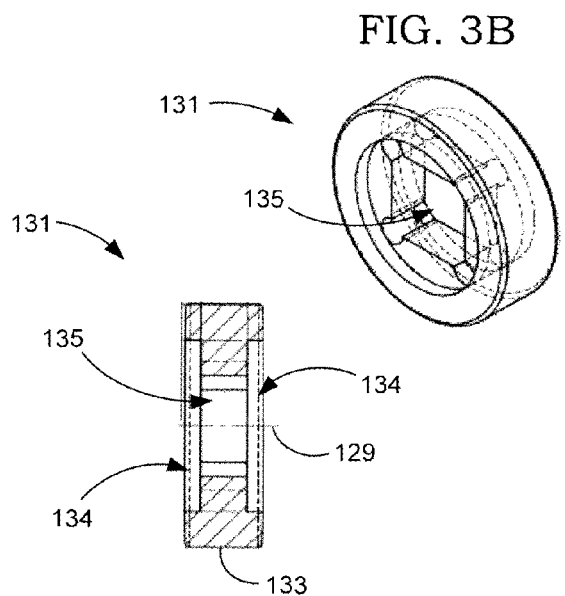
FIG. 3
FIG. 3A
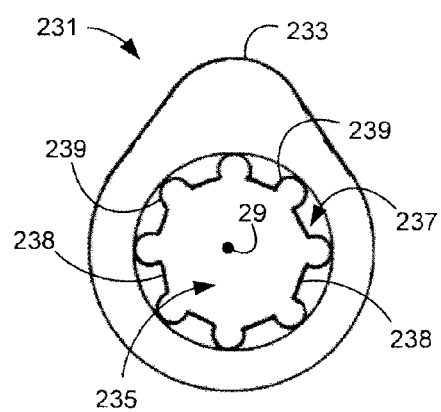
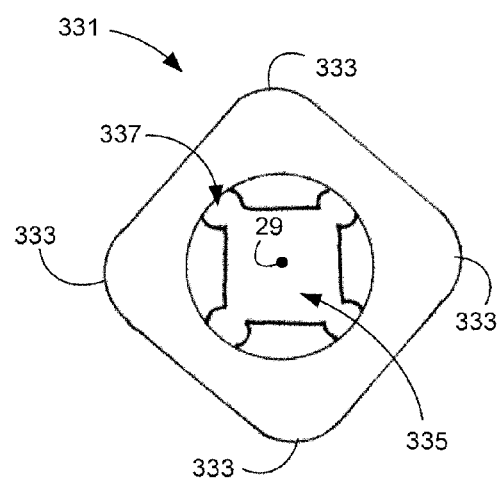
FIG. 4
FIG. 5

US 8,807,106 B2

CAMSHAFT

CROSS-REFERENCE TO RELATED PATENT APPLICATIONS

This application claims priority from U.S. Provisional Patent Application No. 61/315,740, filed on Mar. 19, 2010. The foregoing provisional application is incorporated by reference herein in its entirety.

BACKGROUND

The present application relates generally to the field of camshafts for use in internal combustion engines. More specifically, this application relates to a camshaft assembly having at least one member insert molded onto a cast iron camshaft body to efficiently tailor the strength and durability of the camshaft assembly to withstand varying levels of stress and loading.

SUMMARY

According to a disclosed embodiment, a camshaft assembly configured to rotate about an axis of rotation within the engine of a motor vehicle to provide timing between cyclic operation of engine components is provided. The camshaft assembly includes a member for providing timing to a first engine component. The member includes a cam surface configured to drive the timing of the first engine component, and an opening. The camshaft assembly also includes a camshaft body cast to the member and configured to engage the opening of the member. The camshaft body includes a lobe configured to drive the timing of a second engine component, and a journal configured to allow efficient rotation of the camshaft body about the axis of rotation. The member is formed from a first material and the camshaft body is formed from a second material, thereby allowing the camshaft assembly to withstand two levels of stress.

The opening of the member may include an anti-rotation feature configured to engage a mating feature of the camshaft body, thereby prohibiting rotation about the axis of rotation of the member relative to the camshaft body. The anti-rotation feature may be configured as a key-way having a polygonal portion and a plurality of semi-circular portions, wherein each semi-circular portion is configured in one corner of the polygonal portion. The camshaft body may further include a shoulder configured to prohibit movement of the member along the camshaft body in the direction toward the shoulder. The member may include a bore configured to engage the shoulder of the camshaft body. The camshaft body may further include a second shoulder provided on the opposite side of the member relative to the first shoulder, to prohibit movement of the member along the camshaft body in the direction toward the second shoulder and opposite to the first shoulder. The member may include a second bore configured to engage the second shoulder of the camshaft body.

The camshaft body may include a plurality of lobes, wherein each lobe is configured to drive the timing of an engine component. The camshaft assembly may further comprise a plurality of members, wherein each member is provided on the camshaft body to drive timing to an engine component. Each of the plurality of members may be formed from a material different than the material of the first member and the material of the camshaft body, thereby allowing the camshaft assembly to withstand a plurality of levels of stress. The first material comprising the member may be a high strength material, such as AISI 5150 steel. The first material comprising the member may also be a low strength material.

According to another disclosed embodiment, a process for producing a camshaft assembly configured to rotate about an axis of rotation within the engine of a motor vehicle to provide timing between cyclic operation of engine components is provided. The process includes a first step of forming a member from a first material, such that the member includes a cam surface and an opening; a second step of placing the member into a mold having a cavity that is configured in the shape of a camshaft body, and a gate configured to receive molten material; a third step of inserting a molten second material into the gate of the mold to form the camshaft body; and a forth step of removing the camshaft assembly from the mold, whereby the camshaft assembly includes a member made from a first material and a camshaft body made from a second different material.

According to another disclosed embodiment, a process for producing a camshaft assembly configured to rotate about an axis of rotation within the engine of a motor vehicle to provide timing between cyclic operation of engine components is provided. The process includes a first step of forming a member from a first material and forming a plurality of members from a different material; a second step of placing the plurality of members into a mold having a cavity configured in the shape of a camshaft body, and a gate to receive molten material; and a forth step of removing the camshaft assembly from the mold, whereby the camshaft assembly includes a member made from a first material, a camshaft body made from a second different material, and a plurality of members made from materials different than the first and second materials.

BRIEF DESCRIPTION OF THE DRAWINGS

FIG. 1A is an exploded perspective view of a portion of an exemplary embodiment of a camshaft assembly.

FIG. 1B is a perspective view of the camshaft assembly of FIG. 1A.

FIG. 2 is a perspective detail view of one end of the camshaft assembly of FIG. 1B.

FIG. 3 is a side view of an exemplary embodiment of a member for use in a camshaft assembly, such as the camshaft assembly of FIG. 1B.

FIG. 3A is a sectional view of the member of FIG. 3, taken along line A-A.

FIG. 3B is a perspective view of the member of FIG. 3.

FIG. 4 is a side view of another exemplary embodiment of a member for use in a camshaft assembly.

FIG. 5 is a side view of another exemplary embodiment of a member for use in a camshaft assembly.

DETAILED DESCRIPTION

Camshafts conventionally have been used in internal combustion engines to control the timing of the valves to properly sequence the opening and closing of the valves with the stroke of the engine cylinders to control the intake and exhaust of fluid, such as fuel and air. Typically, a camshaft includes a camshaft body or shaft, a plurality of intake and exhaust lobes, and a plurality of journals. The camshaft is configured to rotate about a longitudinal axis or axis of rotation, with each end of the camshaft body, as well as the plurality of journals along the length of the camshaft body rotatably coupled to bearings in the engine. The plurality of journal-to-bearing couplings allow efficient rotation of the camshaft with reduced losses (e.g., friction) and provide structural support along the length of the camshaft body to improve durability (and thus the longevity of the camshaft). Along the length of the camshaft body are a plurality of intake and exhaust lobes, often positioned in groups, which pertain to a specific cylinder of the engine. For example, a camshaft for use in a four cylinder engine may include four groups of lobes with each group having one intake lobe and one exhaust lobe for each cylinder. Usually, each lobe will be associated with one valve of one cylinder of the engine, where the engine may include more than one valve per cylinder.

The camshaft controls the timing of the valve, properly sequencing the opening and closing of the valve, through the shape or profile of the lobe. For example, the engine may be configured so that the valve stem maintains contact with the profile of the lobe by a biasing member or mechanism (e.g., a valve spring). Another example, the engine may include a pushrod valve gear mechanism, which includes a roller, pushrod, and rocker arm. The roller maintains contact with the profile of the lobe, and is pivotally coupled to a pushrod, which is configured to translate along the longitudinal axis of the pushrod. The end of the pushrod opposite to the roller is coupled to a rocker arm. The rocker arm may include two distal ends with a pivot between the ends, where the first end engages the pushrod and the second end engages the stem of the valve. The rocker arm rotates about the pivot when a force is imparted onto the first end of the rocker arm by the displacement of the pushrod translating along the longitudinal axis of the pushrod. The pivoting of the rocker arm displaces the second distal end of the rocker arm, which in turn translates the valve along the longitudinal axis of the valve, opening and closing the valve. The valve may include a biasing mechanism to bias the valve in a direction, such as in the direction closing the valve. There are other engine configurations which utilize a camshaft to control the timing of the valves, and the present application is not limited to those examples disclosed herein.

Regardless of the method in which the profile of the intake and exhaust lobes control valve timing, the profile of each lobe may be configured as an eccentric so that the rotation of the lobe about the axis of rotation of the camshaft displaces the contacting (or mating) member (e.g., valve stern, finger-follower, roller and pushrod), which maintains contact with the lobe along the profile of the lobe. This displacement of the contacting member is used to translate the valve between a closed position and an open position. Thus, the profile of the intake or exhaust lobe is configured to properly time the opening and closing of the valve to the cylinder stroke position, to correspond to the operating mode of cylinder (i.e., intake, compression, combustion, exhaust).

During engine operation, the profile of the lobe is subjected to Hertzian stress induced from the contact between the lobe and the contacting member, such as a roller or finger-follower. Since the camshaft rotates at relative high speeds, the biasing member must be relatively strong in order to maintain contact between the lobe of the camshaft and the contacting member. This biasing member imparts a normal force into the surface of the lobe at the contact surface. The high Hertzian stresses induced by internal combustion engines for motor vehicles, especially in diesel engines, requires the camshaft to be made of a material, such as cast iron, that has a relative high strength (e.g., ultimate tensile strength, yield strength) and is resistant to wear or abrasion for long periods of cyclic operation. The conventional camshafts, such as the cast iron camshafts, were efficiently designed, since the stresses at each lobe were substantially uniform.

The camshaft assemblies disclosed herein may be configured to withstand a second level of Hertzian stress induced by a second engine device, which may be relatively higher than the Hertzian stress between the intake and exhaust lobes of the camshaft and the contacting member, which maintains contact to the respective intake and exhaust lobe to control valve timing. For example, the second engine device may be the fuel pump, where the engine of the vehicle may be configured to have the fuel delivery from the fuel pump metered or controlled by the camshaft, which operates under high pressure to properly inject fuel as atomized gas vapor into the cylinder of the engine to maximize efficiency of the combustion process. The contact between the camshaft assembly and the contacting member from the fuel pump system may impart a higher loading or stress (e.g., Hertzian) into the camshaft relative to the loading or stress imparted from the device controlling valve timing (e.g., valve stem, roller).

Camshaft assemblies disclosed herein may be configured to withstand a plurality of levels of stress (e.g., Hertzian), which may vary along the axis of rotation (or longitudinal axis) of the camshaft. This could be achieved by having the camshaft assembly comprise a plurality of members, where each member may be configured to withstand common or unique levels of loading and stress. Thus, the camshaft assemblies disclosed herein may be tailored to efficiently manage any number of varying levels of stress and loading along the axis of rotation of the camshaft. This configuration optimizes mass, strength, and cost of the camshaft assembly by tailoring different portions of the camshaft to withstand varying stress levels, and by not having the complete camshaft assembly designed to withstand the highest level of stress and loading.

FIGS. 1A, 1B and 2 illustrate a portion of an exemplary embodiment of a camshaft assembly 20, both as a coupled assembly (FIG. 1B) and as in an exploded view format, (FIG. 1A). The camshaft assembly 20 includes a camshaft body 21 and a member 31. According to an exemplary embodiment, the member 31 is made from a material, such as AISI 5150 steel, having a higher strength (e.g., ultimate tensile strength, yield strength) relative to the strength of the camshaft body 21. According to another exemplary embodiment, the member 31 is made from a material, such as gray iron, having a lower strength relative to the strength of the camshaft body. The member 31 having a different strength than the camshaft body 21 allows the camshaft assembly 20 to have a tailored strength to efficiently manage the varying stress levels along the length of the camshaft. The member 31 may be made, for example, by forging then broaching the required shape, by forging then machining the required shape, by forming a tube over a mandrel then cutting to length (and machining if necessary), or by any useful method. The member may have any geometry and may be a gear (e.g., spur, helical), an eccentric (e.g., cam), or may be any useful shape, which may perform any useful function.

According to an exemplary embodiment, the member 31 includes an opening 35 that is configured to receive the camshaft body 21. The member 31 may be placed in a mold, such as a green sand mold, whereby the camshaft body 21 may be cast in place to include the member 31, integrally forming the camshaft assembly 20. The camshaft body 21 may be made from cast iron or any other useful casting material. According to an exemplary embodiment, the camshaft body 21 is configured as a shaft 22 comprising a plurality of journals 25 and a plurality of intake and exhaust lobes 23. Each journal 25 may rotatably couple to a bearing in the engine to allow for rotation of the camshaft assembly 20 about an axis of rotation 29 relative to the engine with reduced friction and may provide support to counter (i.e., react to) the bending forces imparted onto the camshaft assembly by the plurality of contacting members. The plurality of intake and exhaust lobes 23 may vary in number and rotational alignment (or orientation)

to accommodate varying customer requirements. For example, the camshaft body 21 may be cast to create four pairs of lobes 23, where each pair includes one intake lobe 23 and one exhaust lobe 23, which correspond to one intake and one exhaust valve within one engine cylinder. Another example, an engine may include a plurality of valves for each cylinder, where the opening and closing of the plurality of valves for each cylinder may be controlled by a common lobe or by unique lobes.

The camshaft body 21 may further be formed to include a shoulder 27, which may engage the member 31 to prevent the member 31 from sliding along the axis of rotation 29 in the direction toward the shoulder. The shoulder 27 may be configured to abut the member 31 or to be adjacent to the member 31 to prohibit or limit the movement of the member 31 along the axis of rotation 29 relative to the camshaft body 21 and the shoulder 27. The camshaft body 21 may include a plurality of shoulders 27. For example, the camshaft body may include two shoulders, as shown in FIG. 1A, to retain the member by preventing the member from sliding in either direction along the axis of rotation.

The camshaft body 21 may further include an anti-rotation feature 28 configured to prohibit rotation of the member 31 relative to the camshaft body 21 about the axis of rotation 29. According to an exemplary embodiment, the anti-rotation feature 28 is configured as an annular step having a plurality of splines or embosses that extend substantially parallel to the axis of rotation 29 along the profile of the outer surface (i.e., the outer circumference) of the annular step of the anti-rotation feature. When the camshaft body 21 is formed to engage the opening 35 of the member 31, the outer surface or profile of the camshaft body 21 forms the anti-rotation feature 28 by taking a shape substantially similar to the inner surface (or profile) 32 of the member 31. Alternatively, the member 31 may be formed over the anti-rotation feature 28 of the camshaft body 21, the inner surface 32 of the member 31 forms a shape substantially similar to the shape of the outer profile of the anti-rotation feature 28 of the camshaft body 21. The splines or embosses therefore prohibit rotation about the axis of rotation 29 of the member 31 relative to the camshaft body 21. The anti-rotation feature may be formed using any now known or future developed method to prohibit rotation between two abutting members or components, and the splined method disclosed herein is not meant as a limitation.

FIGS. 3, 3A, and 3B illustrate an exemplary embodiment of a member 131. The member 131 may be annular in shape or irregular in shape. The member 131 may be configured to rotate about an axis of rotation 129, which may be coincident to the axis of rotation 29 of the camshaft body 21 upon casting the camshaft body 21 to the member 131. The annular member 131 may include a cam surface 133, which may form the outer surface or a portion of the outer surface of the member 131, and an aperture (or opening) 135, which may form an inner surface 132 or a portion of the inner surface of the member 131. The inner surface 132 formed by the opening 135 may be configured to couple the member 131 to the camshaft body 21 to form the camshaft assembly. The inner surface 132 of the member 131 may be configured to prohibit rotation of the member 131 about the axis of rotation 29 relative to the camshaft body 21 after coupling. For example, the inner surface 132 formed by the opening 135 may be configured as a key-way 137 in order to prevent rotation of the member 131 relative to the camshaft body 21, so that the camshaft body 21 and member 131 rotate about the axis of rotation 29 as one member (i.e., having the same angular speed and torque). According to an exemplary embodiment, the cross-section of the key-way 137 includes a rectangle (or square) portion 138 with a semi-circular portion 139 in each corner of the rectangle, such as shown in FIGS. 3 and 5. According to another exemplary embodiment, the cross-section of the key-way 237 includes a polygonal portion 238 with a plurality of semi-circular portions 239, whereby a semi-circular portion 239 is configured in each corner of the polygonal portion 238, such as shown in FIG. 4. According to other embodiments, the cross-section of the key-way may be a spline, a star, or any other useful or suitable shape that transfers torque between two coupled members. The key-way is effective at transferring torque between the member 131 and the camshaft body 21, because when the camshaft body 21 is cast, the molten material (e.g., cast iron) forms the mating shape to the inner surface 132 of the member 131. Thus, the outer surface of the camshaft body 21, which may be adjacent to and may contact (or abut) the member 131, forms the mating key-way shape, thereby allowing the transfer of torque from the camshaft body 21 into the member 131.

The member may include an opening that has a circular cross-section, therefore not having a key-way. However, this configuration would transfer less torque between the member and the camshaft body, relative to the configurations having key-ways. Additionally, when the camshaft body is cast and the molten material (e.g., cast iron) contacts the member, the molten material has a tendency to shrink during cooling, causing the outside surface of the camshaft body to shrink away from the inside surface of the member. This tendency further reduces the ability to transfer torque between the member having a circular cross-section and the camshaft body.

According to an exemplary embodiment, the member 131 further includes a counter bore 134, such as shown in FIG. 3A. The counter-bore 134 may be substantially concentric to the opening 135, and may engage a shoulder 27 formed in the camshaft body 21 to prevent the member 131 from translating relative to the camshaft body 21 along the axis of rotation 29 in the direction towards the shoulder 27 of the camshaft body 21. The member 131 may include counter-bores 134 in both sides to engage two opposing shoulders 27 of the camshaft body 21 to prevent the member 131 from translating in either direction relative to the camshaft body 21 along the axis of rotation 29.

According to an exemplary embodiment, the cam surface 133 of the member 131 may be circular and concentric to the axis of rotation 29, as shown in FIG. 3. This configuration does not need the member 131 to be oriented (i.e., rotationally aligned) relative to the camshaft body 21 during casting of the camshaft body 21. Following casting of the camshaft body 21, which couples the member 131 to the camshaft body 21 and forms the camshaft assembly 20, the cam surface 133 may be modified using a secondary process (e.g., machining, broaching, laser trimming) to create an eccentric surface. Through fixtures or other devices, the secondary process can orient the eccentric surface on the cam surface 133 of the member 131 relative to the camshaft body 21 to control the timing of the device that engages the cam surface of the member relative to the timing of the camshaft (and consequently to the timing of the valves). For example, the member may be used to control the timing of the fuel pump (i.e., the cam surface of the member may control when the fuel pump supplies fuel to the engine), which may be timed (via rotational orientation or alignment) relative to the intake and exhaust lobes on the camshaft body. Thus, the timing of when fuel is distributed to the engine and when the intake or exhaust valves open and close can all be timed together and controlled by the camshaft assembly.

According to the exemplary embodiment shown in FIG. 4, the member 231 may be configured to include a cam surface 233 that includes an eccentric surface relative to the axis of rotation 29. The member 231 includes an opening 235 that is configured to be filled when the camshaft body 21 is cast to the member 231. The opening 235 may include a key-way 237 or other anti-rotation feature to prohibit rotation of the member 231 relative to the camshaft body 21. During casting of the camshaft body 21, the member 231 may be oriented relative to the camshaft body 21 (e.g., to one or more than one lobe on the camshaft body 21) to rotationally align the member 231 with the camshaft body 21 to have proper timing between the member 231 and the camshaft body 21. This configuration removes any need for secondary operations or processes to form the eccentric in the cam surface, such as described above.

According to another exemplary embodiment, the member 331 may include a plurality of cam surfaces 333. For example, the member 331 may include four cam surfaces 333, whereby each cam surface 333 includes an eccentric surface relative to the axis of rotation 29, as shown in FIG. 5. The member 331 includes an opening 335 having a key-way 337 or other anti-rotation feature to prohibit rotation of the member 331 relative to the camshaft body when formed (e.g., cast). This configuration may control the delivery of fuel from the fuel pump to the engine. For example, a four cylinder engine may be configured to undergo combustion inside each cylinder one time per rotation of the camshaft. Thus, the fuel pump will need to deliver fuel to each cylinder once per camshaft rotation, where the timing of fuel delivery can be controlled by the cam surfaces 333 of the member 331 of the camshaft assembly. The member may be configured with any number of cam surfaces and the angle (i.e., rotational orientation or alignment) between the cam surfaces may vary to accommodate different customer requirements. Therefore, even though FIG. 5 illustrates four cam surfaces 333 with each cam surface 333 being substantially ninety (90) degrees out-of-phase with the adjacent cam surfaces, the angle between any two or the plurality of cam surfaces may vary and be independent. The location, shape and number of cam surfaces may be tailored to meet varying requirements.

The camshaft assemblies disclosed herein allow for efficient design of the assembly to accommodate different forces (or loads) that different portions of the camshaft are subjected to, such as during operation within an engine. For example, the forces imparted on the plurality of intake and exhaust lobes may be substantially similar, however the forces imparted on the member may be considerable higher (or lower) relative to the intake and exhaust lobe forces. This may result from the engine device mating to the cam surface of the member imparting a higher force relative to the forces from the mating valve members onto the intake and exhaust lobes. For example, the high forces may be caused by the fuel pump operating under high pressure to properly inject fuel as atomized gas vapor into the cylinder of the engine to maximize efficiency of the combustion process. This may also result from the member being configured with a plurality of cam surfaces. Since the camshaft rotates at such high angular speeds or frequencies a relative strong biasing member is required to maintain proper contact between the cam surface and the mating member. Thus, the force from the biasing member may need to be further increased to accommodate the plurality of cam surfaces.

The forces imparted onto the face of the cam surfaces of the member of the camshaft assembly from the contacting member being higher, relative to the forces imparted onto the face of the cam surfaces of the intake and exhaust lobes, requires the strength and durability of the member to be increased relative to the strength and durability of the intake and exhaust lobes. To accommodate the higher forces imparted onto the member, the member may be made from a material (e.g., AISI 5150 steel) having higher mechanical properties (e.g., ultimate tensile strength, yield strength) relative to the cast iron used to form the camshaft body. The camshaft assemblies formed, as disclosed herein, efficiently manage the loads and corresponding stresses by having the camshaft body tailored to a first level of loading and stress and by having the member tailored to a second level of loading of stress. This configuration eliminates the need to form the entire camshaft assembly to meet a second level of loading and stress, which would be inefficient and expensive. Also, as disclosed herein, the member may accommodate forces imparted onto the cam surfaces of the member of the camshaft assembly by the contacting member of the engine that may be lower, relative to the forces imparted onto the intake or exhaust lobes.

Furthermore, a camshaft assembly may be formed to include a plurality of members integrally formed with a cast camshaft body. The plurality of members may be commonly tailored to meet the same level of loading and stress (e.g., by being made from the same material and having a common geometry), or the plurality of members may be uniquely tailored to varying levels of loading and stress (e.g., by each member being made from a different material and/or having different geometry). Thus, the camshaft assembly may efficiently manage varying levels of loading and stress along the axis of rotation, which minimizes mass and cost of the camshaft assembly.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the camshafts as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A camshaft assembly configured to rotate about an axis of rotation within the engine of a motor vehicle to provide timing between cyclic operation of engine components, comprising:
   a member for providing timing to a first engine component;
   wherein the member includes a cam surface configured to drive the timing of the first engine component, a bore, and an opening; and
   a camshaft body cast to the member and configured to engage the opening of the member;
   wherein the camshaft body includes a lobe configured to drive the timing of a second engine component, a shoulder configured to engage the bore to prohibit movement of the member along the camshaft body in the direction of the shoulder, and a journal configured to allow efficient rotation of the camshaft body about the axis of rotation; and
   wherein the member is formed from a first material and the camshaft body is formed from a second material, thereby allowing the camshaft assembly to withstand two levels of stress.

2. The camshaft assembly of claim 1, wherein the opening of the member includes an anti-rotation feature configured to engage a mating feature of the camshaft body, thereby prohibiting rotation about the axis of rotation of the member relative to the camshaft body.

3. The camshaft assembly of claim 2, wherein the anti-rotation feature is configured as a key-way having a polygonal portion and a plurality of semi-circular portions, wherein each semi-circular portion is configured in one corner of the polygonal portion.

4. The camshaft assembly of claim 1, wherein the camshaft body further includes a second shoulder provided on the opposite side of the member relative to the first shoulder, to prohibit movement of the member along the camshaft body in the direction toward the second shoulder and opposite to the first shoulder.

5. The camshaft assembly of claim 4, wherein the member includes a second bore configured to engage the second shoulder of the camshaft body.

6. The camshaft assembly of claim 1, wherein the camshaft body includes a plurality of lobes, wherein each lobe is configured to drive the timing of an engine component.

7. The camshaft assembly of claim 1, further comprising a plurality of members, wherein each member is provided on the camshaft body to drive timing to an engine component.

8. The camshaft assembly of claim 7, wherein each of the plurality of members is formed from a material different than the material of the first member and the material of the camshaft body, thereby allowing the camshaft assembly to withstand a plurality of levels of stress.

9. The camshaft assembly of claim 1, wherein the first material comprising the member is AISI 5150 steel.

10. The camshaft assembly of claim 1, wherein the opening of the member is in direct contact with the camshaft body.

11. The camshaft assembly of claim 2, wherein the anti-rotation feature of the member is in direct contact with the mating feature of the camshaft body.

12. A camshaft assembly configured to rotate about an axis of rotation within the engine of a motor vehicle to provide timing between cyclic operation of engine components, comprising:
   a camshaft body including a plurality of intake and exhaust lobes for controlling a plurality of intake and exhaust valves of the engine, each lobe having a cam surface thereon;
   a first member including a cam surface for controlling the timing of a first engine component and an opening that is in direct contact with an anti-rotation feature of a first portion of the camshaft body; and
   a second member including a cam surface for controlling the timing of a second engine component and an opening that is in direct contact with an anti-rotation feature of a second portion of the camshaft body;
   wherein the camshaft body comprises a first material configured to withstand a first level of stress, the first member comprises a second material configured to withstand a second level of stress different than the first level of stress, and the second member comprises a third material configured to withstand a third level of stress different than the first and second levels of stress.

13. The camshaft assembly of claim 12, wherein at least one of the first and second members includes a plurality of cam surfaces, and wherein each cam surface is out-of-phase by a predetermined angle relative to an adjacent cam surface.

14. The camshaft assembly of claim 13, wherein the plurality of cam surfaces comprises four cam surfaces, and wherein each cam surface is 90° out-of-phase from the adjacent cam surfaces.

15. The camshaft assembly of claim 12, wherein the opening of at least one of the first and second members includes a polygonal portion with a plurality of semi-circular portions.

16. The camshaft assembly of claim 15, wherein one semi-circular portion is provided in each corner of the polygonal portion.

17. The camshaft assembly of claim 16, wherein at least one of the anti-rotation features of the first and second portions of the camshaft body includes a polygonal portion with a plurality of semi-circular portions that complement the opening of the at least one of the first and second members.

18. The camshaft assembly of claim 17, wherein the camshaft body includes a pair of offset annular shoulders, and wherein each shoulder is configured to engage an annular counter bore disposed on a side of one of the first and second members.

19. The camshaft assembly of claim 18, wherein the polygonal portion and plurality of semi-circular portions of the at least one of the first and second portions of the camshaft body extend between and are connected to the pair of shoulders of the camshaft body.

* * * * *